United States Patent [19]

Vallat et al.

[11] Patent Number: 4,851,811
[45] Date of Patent: Jul. 25, 1989

[54] COMMUNICATION DEVICE FOR ENTRIES OF BUILDINGS

[76] Inventors: Xavier Vallat, 3 and 5, rue du Pré de la Dame, 57520 Silly-Sur-Nied (Moselle); Pierre Renaud, 8bis, Route de Briey, 57160 Chatel-Saint-Germain (Moselle), both of France

[21] Appl. No.: 75,946

[22] Filed: Jul. 21, 1987

[30] Foreign Application Priority Data

Jul. 25, 1986 [FR] France .................................. 86 10941

[51] Int. Cl.$^4$ ................................................ G08B 7/06
[52] U.S. Cl. ...................................... 340/326; 340/313; 340/286 R
[58] Field of Search ...................... 340/326, 311.1, 313, 340/365 VL, 716; 379/103, 171, 172, 173, 167; 341/23, 175, 176

[56] References Cited

U.S. PATENT DOCUMENTS

| 3,404,393 | 10/1968 | Blivice et al. | 340/286 R |
| 3,665,116 | 5/1972 | Holstrom | 379/167 |
| 3,911,228 | 10/1975 | Gow | 379/103 |
| 3,917,911 | 11/1975 | Lesher | 379/103 |
| 3,978,468 | 8/1976 | Bond et al. | 379/103 |
| 4,313,108 | 1/1982 | Yoshida | 340/365 VL |
| 4,518,826 | 5/1985 | Caudill et al. | 379/167 X |

FOREIGN PATENT DOCUMENTS

| 0146276 | 6/1985 | European Pat. Off. | 340/365 VL |
| 0198411 | 10/1986 | European Pat. Off. | |
| 2332188 | 1/1975 | Fed. Rep. of Germany | |
| 2921485 | 2/1980 | Fed. Rep. of Germany | |

Primary Examiner—Joseph A. Orsino
Assistant Examiner—Brian R. Tumm
Attorney, Agent, or Firm—Sandler & Greenblum

[57] ABSTRACT

A communication device for entries to buildings with several apartments including a support in one piece with the outside facade of the building having a transparent body formed by a plate of bulletproof glass which is entirely smooth and is provided with a perimeter larger than the perimeter of an opening made in a metallic frame, a plate covered by the transparent body, and having screens for visualizing and displaying permanent and temporary information, formed of a plate of liquid crystals comprising visualization and displaying screens entirely covered by the transparent body, an outside loudspeaker, at least one bell or other device for translating an impulse into sound or other indicia or signals with a place for the name, at least one inside loudspeaker fitted with a contactor, connectors and selectors formed by a control and selection element with a memory connected to the different screens, the visualization and display screens for the permanent and temporary information being acted on by the bell activated by the person outside the building or by the contactor activated by one of the occupants of the building via the control and selection element with memory, permitting conversation between that occupant and the person outside the building.

4 Claims, 1 Drawing Sheet

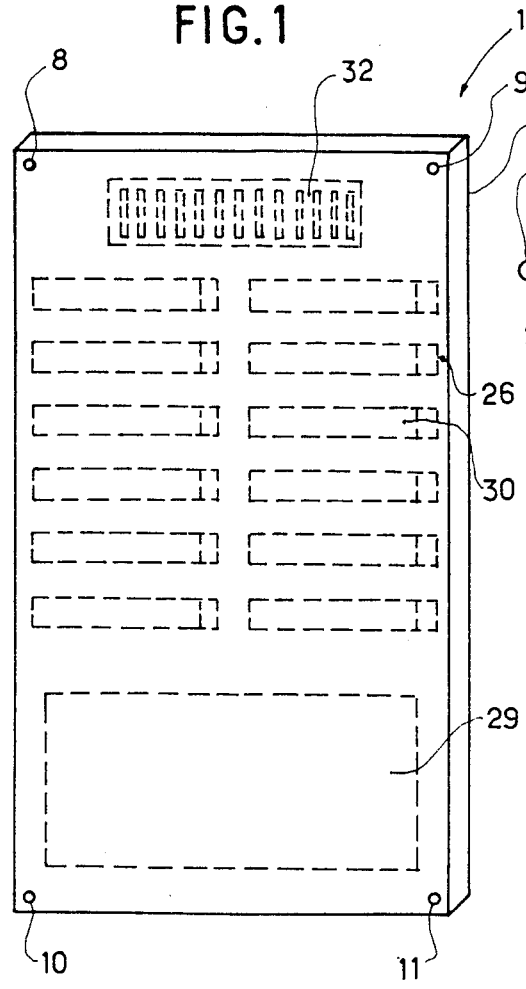
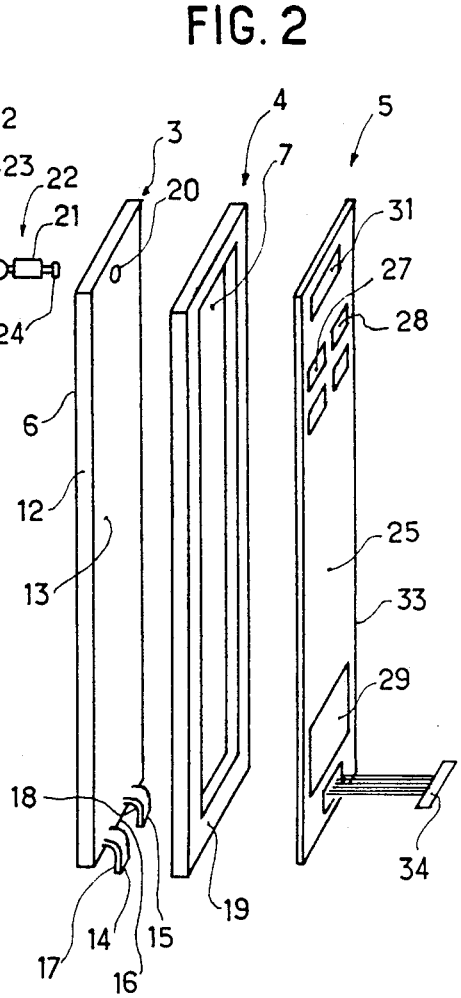
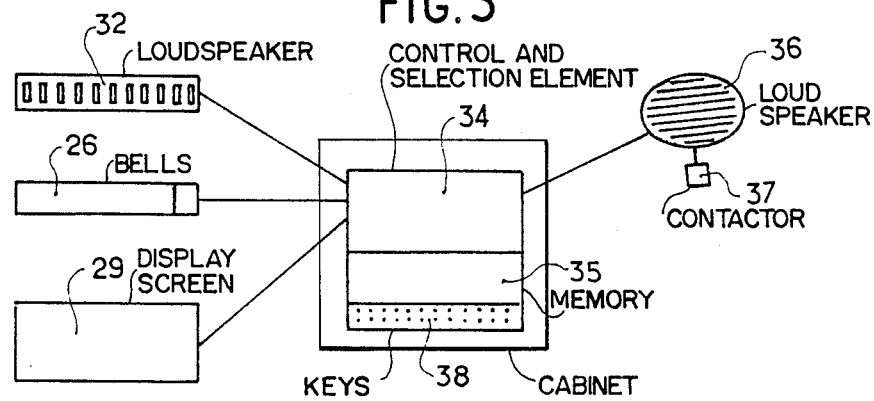

COMMUNICATION DEVICE FOR ENTRIES OF BUILDINGS

BACKGROUND OF THE INVENTION

1. Field of the Invention

The invention relates to communication devices for entries of buildings with several apartments.

2. Discussion of Background and Material Information

Conventional communication devices for entries of buildings include a support in one piece with the outside facade of the building which is accessible to persons wishing to enter the building. This support normally includes a loudspeaker and a certain number of bells, wherein the number of bells correspond with the number of apartments in the building. The bell(s) has (have) a place for identifying the occupant corresponding to the bell. This external loudspeaker is connected by suitable means to internal loudspeakers located within the occupant's apartment which are fitted with a contactor permitting the occupant to talk with the person outside. If there are a number of apartments, and thus a number of loudspeakers, the communication device also includes means of selection for connecting the bell that has been activated to the corresponding inside loudspeaker.

However, these known devices present several disadvantages. When the occupants of the apartment change, the names on the bells have to be changed. This updating is frequently made by various means that are usually unaesthetic: i.e., sections cut out from visiting or business cards, handwritten inscriptions and the like. There can obviously be no uniformity in these types of various arrangements, and this increases still further the unaesthetic aspect of the outside metallic support. Although there are buildings in which a certain standardization is imposed, e.g., by the use of engraved plates, the cost of manufacturing and placing these is high.

In addition to this essentially aesthetic aspect these are also problems caused by aggression and vandalism to which these communication devices are subject, particularly the elements situated outside which are within the reach of all kinds of aggressions.

In addition, numerous buildings contain offices and professional premises such as those of doctors and lawyers, so that the facade of the entry to the building is surrounded by panels giving information such as the activity of the occupant, opening hours, and similar information. This type of panel not only deteriorates from the aspect of the facade, but frequently the space available is not enough for all the panels.

Finally, communication between the person outside and the occupant, based entirely on speech, is sometimes difficult because of the background noise frequently surrounding the person outside, in particular when the building is situated along a road with heavy traffic.

The aim of this invention is to overcome these disadvantages.

SUMMARY OF THE INVENTION

For this purpose, the invention directed to a communication device for the entries of buildings with several apartments comprising which includes a support in one piece with the outer facade of the building and comprising a transparent body formed of a plate of bulletproof glass which is entirely smooth and has composed of upper perimeter greater than the perimeter of an opening made in a metallic frame, a plate covered by the transparent body having means of visualizing and displaying permanent and temporary information formed of a plate of liquid crystals comprising visualization and display screens entirely covered by the transparent body, an outside loudspeaker, at least one bell with a place for the name, at least one inside loudspeaker fitted with a contactor, means of connection and selection formed by a control and selection element with a memory, connected to the different screens, the means of visualizing and displaying permanent and temporary information being activated by the bell pushed by the person outside the building or via the control and selection element permitting conversation between this occupant and the person outside the building.

According to another characteristic of the invention, the means of visualizing and displaying permanent and/or temporary information are a plate of liquid crystals comprising visualization and display screens entirely covered by the transparent body, the different screens being connected to the control element with its memory.

The advantages obtained by means of this invention consist essentially in the fact that permanent information such as the names of the occupants and temporary information such as information of general interest for the occupants and/or personal messages for the persons and/or companies housed in the building who have to communicate a message to customers can be changed easily without the cumbersome task of dismantling while at the same time having an undeniable aesthetic aspect.

Furthermore, this considerably increases the capacity for personal messages because they are put into the memory of the control element with its memory.

We also back up the means of acoustic communication by means of visual communication which makes for easier understanding of the dialogue between the person outside the building and the occupant of the building.

Another advantage arises from the fact that the transparent body is a plate of bulletproof glass which is entirely smooth. So this body has no roughness or grip, and this counters the aggression and vandalism to which known devices are subject. According to another characteristic of the invention, the plate of liquid crystals comprises the bells formed by the screens for the visualization of permanent information displaying the name corresponding to the occupant, the number of screens corresponding to the number of apartments. According to another characteristic of the invention, the plate of liquid crystals comprises a screen for displaying temporary information on a large surface, the appearance of the information being controlled by the corresponding bell.

BRIEF DESCRIPTION OF THE DRAWING

The invention will be clearly understood by reference to the following description which is given as a non-limitative example, and to the annexed drawing in which:

FIG. 1 is an elevation of the communication device according to the invention.

FIG. 2 is an exploded view in perspective of the essential elements of the communication device.

FIG. 3 is a diagram of the working device.

DETAILED DESCRIPTION

The following description relates essentially to the part of the communication device fixed at the entry of a building or at a place accessible from the outside as shown in FIGS. 1 and 2.

The communication device 1 comprises, among other things, a support 2. This is composed of three main elements, a body 3, a metallic frame 4, and a frame for visualizing and displaying information 5.

It will be advantageous for the body 3 to be a transparent body permitting the information to be read. To counter risks of deterioration, the transparent body 3 has no roughness nor opening on its outside face 6. This transparent body 3 is recessed in an opening 7 made in the metallic frame 4. The latter is sealed in the walls by means for fixings 8, 9, 10, 11. However, these means for fixings 8 to 11 are not accessible from the outside since they are covered by the transparent body 3. The latter presents on its rear face 13 two lugs 14, 15, situated near the lower edge 16 of the transparent body 3. These lugs 14, 15 are shaped as hooks, and their outside faces 17,18 are applied against the inside face 19 of the metallic frame 4. To ensure that the transparent body 3 is held in place, and to rule out any possibility of its untimely withdrawal by separating it from the metallic frame 4, in this transparent body 3 a hole 20 is made in which it is possible to engage the body 21 of a lock 22 activitated by a security key 23. This lock 22 comprises a bolt 24 which, on locking, is placed behind the inside face 19 of the metallic frame 4. The means of communicating, e.g., signaling visualizing and displaying a, information are formed by a plate of liquid crystals 25. This plate of liquid crystals 25 comprises, on the one hand, bells, signals, or means for translating an impulse as sound or other indicia in the apartment of the occupant. The device 26 consisting of information screens 27,28 which comprise a control area as well as a display area and at least one display or message screen 29. According to the invention, the screens 27,28 of the means for translating impulses 26, intended for giving permanent information, constitute the means for translating impulses and comprise a zone 30 in which is permanently displayed the name or company name of the occupant corresponding to the bell signal or means for translating impulses. Evidently, the number of information screens corresponds to the number of apartments and/or premises in the building.

According to the invention, the plate of liquid crystals 25 comprises at least one display screen 29 for temporary information. For this purpose, the surface of this display screen 29 is larger than that of the information screens 27, 28 of the signals 26. The information screens need have only a restricted surface, since this surface is only for displaying the name of the occupant and the floor of the building, whereas the display screen 29 is intended for receiving a quantity of information of all kinds, such as notices or messages of general interest for the occupants, such as notifications of meetings of joint owners or tenants, work in the building, power or water cuts, disinfection and other works, personal messages for the occupant, or messages for communication to a third party, in particular a client.

Furthermore, the plate of liquid crystals 25 including a housing 31 for placing the outside loudspeaker 32. Should the power of this loudspeaker be inadequate for correctly hearing what is said by the occupant, small holes are made, either in the transparent body 3 or in the metallic frame 4, for the sound to pass.

According to a first variant of the present invention, the plate of liquid crystals 25 is slightly larger than the perimeter of the opening 7 in the metallic frame 4. In this case, the plate of liquid crystals 25 is fixed on the inside face 19 of the metallic frame 4 by means for attachment or fixings which pass through the plate of liquid crystals 25 and are screwed into the metallic frame 4.

According to another embodiment of the present invention, the plate of liquid crystals 25 includes a perimeter 33 which is slightly smaller than the perimeter of the opening 7 and which fits inside the metallic frame. For this purpose, the plate of liquid crystals 25 comprises openings for the passage of the lugs 14,15 of the transparent body 3 and for the passage of the bolt 24 of the lock 22.

Referring now to FIG. 3, outside loudspeaker 32, each bell 26 and the display screen 29 are connected to a control and selection element 34 provided with a memory 35. In the same way, each inside loudspeaker 36 provided with a contactor 37 is connected to this control element. This control and selection element 34 is housed in a locked cabinet accessible only to one designated person.

According to a first variant, the control and selection element 34 comprises keys 38 for inputting the various information into the memory.

According to another variant, the inputting of the various information into the memory is done remotely, and the keys are in a particular room such as the office of the manager of the building.

Because of the presence of a memory, the number of items of information is practically unlimited.

When a bell 26 is activated, the control and selection element 34 calls up the memory 35 in order, on the one hand, to act on the corresponding internal loudspeaker 36 and on the other hand, where necessary, to make a message visible on the display screen 29.

In addition, it is possible to give supplementary functions to the device according to the invention. Thus, there is the possibility either of including a keyboard for the automatic opening of the door by a confidential code, the keyboard being constituted by contacts of the same nature as those of the bells, or a video circuit via the transparent body 3 of the support 2, or a personal or collective alarm signal. For this purpose, it is possible to use the existing electrical circuit connecting the internal loudspeaker 36 to the external loudspeaker 32, and to ensure that alarm signals are highlighted by a blinking light with a sound warning.

We claim:

1. Communication device for the entries of buildings with several apartments comprising a support attached to the outside facade of an entry to a building comprising a transparent body formed of a plate of bulletproof glass which is substantially smooth and which has an upper perimeter which is larger than the perimeter of an opening made in a metallic frame, a plate covered by the transparent body presenting means for visualizing and displaying permanent and temporary information formed by a plate of liquid crystals comprising information screens and display screens covered by the transparent body, an outside loudspeaker, at least one means for translating an impulse into a signal having a place for the name of the occupant, at least one inside loudspeaker fitted with a contactor and having means for connection and selection formed by a control and selection element with a memory connected to a plurality of said information and display screens, the information screens and display screens being acted on by the means for translating pushed by the person outside the building or by the contactor activated by one of the occupants of the building via the control and selection element, so as to permit conversation between the occupant and the person outside the building.

2. Communication device for the entries of building with several apartments comprising a support attached to the external facade of a building and comprising a transparent body formed by a plate of bulletproof glass which is substantially smooth and has an upper perimeter larger than a perimeter of an opening made in a metallic frame having a rear face with two lugs which fasten behind an inside face of the metallic frame and presenting a hole into which is introduced a body of a lock activated by a security key and comprising a bolt which is placed behind the inside face of the metallic frame, a plate covered by the transparent body and presenting means for visualizing and displaying information formed by a plate of liquid crystals comprising information screens and display screens entirely covered by the transparent body, an outside loudspeaker, at least one means for translating an impulse into a signal with a place for the name of the occupant, at least one inside loudspeaker fitted with a contactor, means for connection and selection formed by a control and selection element with a memory connected to a plurality of said information and display screens, the information screens and display screens being acted on by the means for translating pushed by the person outside the building or by the contactor activated by one of the occupants of the building via the control and selection element so as to permit conversation between the occupant and the person outside the building.

3. Communication device for entries of buildings with several apartments comprising a support attached to the outside face of the building and comprising a transparent body formed by a plate of bulletproof glass which is substantially smooth and has a perimeter which is larger than a perimeter of an opening made in a metallic frame and having a rear face with two lugs which are engaged behind an inside face of the metallic frame, a plate covered by the transparent body and having means for visualizing and displaying permanent and temporary information formed by a plate of liquid crystals comprising information screens and display screens entirely covered by the transparent body and provided with means for translating impulses into signals wherein said information screens display permanent information, the number of said information screens corresponding to the number of apartments in the building and a large display screen for displaying temporary information, the appearance of the temporary information being controlled by the corresponding means for translating an outside loudspeaker placed in a housing made in the plate of liquid crystals, at least one inside loudspeaker fitted with a contactor, means of connection and selection formed by a control and selection element with a memory connected to a plurality of said information and display screens, the means of visualizing and displaying permanent and temporary information adapted to be activated by the means for translating impulses pushed by a person outside the building or by the contactor activated by one of the occupants of the building via the control and selection element so as to permit conversation between the occupant and the person outside the building.

4. Communication device for the entries of buildings with several apartments, comprising a support attached to the outside facade of the building and comprising a transparent body formed by a plate of bulletproof glass which is substantially smooth and has a perimeter which is larger than a perimeter of an opening made in a metallic frame and having a rear face with two lugs which engage behind an inside face of the metallic frame and present a hole into which is inserted a body of a lock activated by a security key and comprising a bolt which is placed behind the inside face of the metallic frame, a plate covered by the transparent body comprising means for visualizing and displaying permanent and temporary information comprising a plate of liquid crystals comprising information screens and display screens entirely covered by the transparent body and provided with means for translating impulses into signals, wherein said information screens correspond to the number of apartments in the building and said display screen has a large surface for temporary information, the appearance of the information on said information screens and display screen being controlled by a corresponding means for translating impulses, an outside loudspeaker placed in a housing made in the plate of liquid crystals, at least one inside loudspeaker provided with a contactor, means for connection and means for selection formed by a control and selection element connected to said information screens and said display screen, the control and selection element with its memory comprising keys for inputting information into the memory, wherein said keys may be located at a certain distance from a cabinet housing the control and selection element with its memory.

* * * * *